United States Patent [19]
Chen et al.

[11] Patent Number: 5,968,182
[45] Date of Patent: Oct. 19, 1999

[54] METHOD AND MEANS FOR UTILIZING DEVICE LONG BUSY RESPONSE FOR RESOLVING DETECTED ANOMALIES AT THE LOWEST LEVEL IN A HIERARCHICAL, DEMAND/RESPONSE STORAGE MANAGEMENT SUBSYSTEM

[75] Inventors: James C. Chen, San Jose; Julia Liu, Sunnyvale; Chan Y. Ng, San Jose, all of Calif.; William G. Sherman, II, Tucson, Ariz.

[73] Assignee: International Business Machines Corporation, Armonk, N.Y.

[21] Appl. No.: 08/854,441

[22] Filed: May 12, 1997

[51] Int. Cl.$^6$ ........................ G06F 11/00
[52] U.S. Cl. ................ 714/5; 714/42; 714/8; 714/48
[58] Field of Search ............... 395/182.03, 182.04, 395/182.05, 182.06, 183.18, 185.01, 185.07, 846, 858, 185.1, 182.09, 183.01, 183.17; 371/37.7, 40.13, 40.15; 364/728.02

[56] References Cited

U.S. PATENT DOCUMENTS

| | | | |
|---|---|---|---|
| 4,207,609 | 6/1980 | Luiz et al. | 395/858 |
| 4,761,785 | 8/1988 | Clark et al. | 371/51.1 |
| 5,191,584 | 3/1993 | Anderson | 371/51.1 |
| 5,210,860 | 5/1993 | Pfeffer et al. | 395/575 |
| 5,214,778 | 5/1993 | Glider et al. | 395/181 |
| 5,274,645 | 12/1993 | Idleman et al. | 395/182.04 |
| 5,274,794 | 12/1993 | Ewing et al. | 395/500 |
| 5,278,838 | 1/1994 | Ng et al. | 395/182.04 |
| 5,331,646 | 7/1994 | Krueger et al. | 371/40.1 |
| 5,367,669 | 11/1994 | Holland et al. | 395/575 |
| 5,504,859 | 4/1996 | Gustafson et al. | 395/182.09 |
| 5,550,543 | 8/1996 | Chen et al. | 341/94 |
| 5,617,425 | 4/1997 | Anderson | 371/10.2 |

*Primary Examiner*—Robert W. Beausoliel, Jr.
*Assistant Examiner*—Andy Nguyen
*Attorney, Agent, or Firm*—R. B. Brodie; E. E. Klein

[57] ABSTRACT

A method and means within a hierarchical, demand/response DASD subsystem of the passive fault management type in which, upon the occurrence of fault, error, or erasure, a long device busy signal of finite duration is provided to a host CPU. Any DASD storage device subject to the anomaly is isolated from any host inquiry during this interval. These measures permit retry or other recovery procedures to be implemented transparent to the host and the executing application. This avoids premature declarations of faults, errors, or erasures and consequent host application aborts and other catastrophic measures. If the detected anomaly is not resolved within the allotted time, then other data recovery procedures can be invoked including device reset, the status reported to the host, and the next request processed.

6 Claims, 4 Drawing Sheets

METHOD AND MEANS FOR UTILIZING DEVICE LONG BUSY RESPONSE FOR RESOLVING DETECTED ANOMALIES AT THE LOWEST LEVEL IN A HIERARCHICAL, DEMAND/RESPONSE STORAGE MANAGEMENT SUBSYSTEM

FIELD OF THE INVENTION

This invention relates to data recovery procedures in hierarchical, demand/response direct access storage device (DASD) subsystems and, more particularly, for managing status reporting to a host operating system as the attached DASD subsystem resolves detected anomalies.

DESCRIPTION OF RELATED ART

The disclosure is initiated with definitions relating to fault and failure, and continues with a brief discussion of hierarchical storage management systems. The section ends with discussions of the prior art modes of managing faults and failures in storage subsystems actively and passively where nesting failures upward can prematurely cause applications at hosts to abort.

Nomenclature of Faults, Failures, and Fault Tolerance

It is to be appreciated that in an information handling system, a "fault" is defined as a malfunction due to any one of several causes. In this regard, a fault may occur on either a transient, intermittent, or permanent basis. Also, a fault may be classified as either a "fail-silent fault" or a "Byzantine fault". Relatedly, a fail-silent fault is that type of malfunction wherein a component just terminates its performance, while a Byzantine fault is an undetected fault condition caused by hardware, software, or both. Technically, a system is said to "fail" when its behavior or activities do not conform to a specification. The same may be said for a "subsystem failure" or a "device failure".

"Fault tolerance" is the degree to which an information handling system, subsystem, device, or component can continue to operate notwithstanding the occurrence of one or more faults or failures. Fault tolerance is attained through the use of information, time, and physical redundancy.

Information redundancy uses additional information to detect, correct, or derive a bounded maximum of information in error, erasure, or unavailability. Time redundancy involves repeating actions otherwise incomplete without altering the system state. One example of time redundancy is "atomic transactions". An atomic transaction comprises a series of steps invoked by a process such that any interruption or failure to complete the series causes the system to return to its prior information state. Lastly, physical redundancy involves replacement of one portion of a physical computing, storage, or control layer with its performance clone.

Parenthetically, in this specification, the term "synchronous system" will be taken to mean a system having the property of always responding to a message within a known finite bound (T seconds). This includes time to process n repeat requests. Also, the term's "disk storage device", "direct access storage device", and the acronym DASD are used synonymously.

Aspects of Hierarchical Demand/Response Storage Subsystems and RAID 5 Arrays

In the period spanning 1970 through 1985, IBM developed large-scale multiprogramming, multitasking computers, S/360 and S/370 running under an MVS operating system. A description of the architecture and that of the attached storage subsystem may be found in Luiz et al., U.S. Pat. No. 4,207,609, "Method and Means for Path Independent Device Reservation and Reconnection in a Multi-CPU and Shared Device Access System", issued Jun. 10, 1980. Such systems were of the hierarchical and demand/responsive type. That is, an application running on the CPU would initiate read and write calls to the operating system. These calls were, in turn, passed to an input/output processor or its virtual equivalent (called a channel) within the CPU. The read or write requests and related accessing information would be passed to an external storage subsystem. The subsystem would responsively give only status (availability, completion, and fault) and pass the requested data to or from the CPU.

The architecture of hierarchical demand/response storage subsystems such as the IBM 3990/3390 Model 6 and the EMC Symmetrix 5500 is organized around a large cache with a DASD-based backing store. This means that read requests are satisfied from the cache. Otherwise, the data satisfying those requests are staged up from the DASDs to the cache. Write updates result in data being sent from the CPU to the cache or to a separate nonvolatile store (NVS), or both. This is the case with the IBM 3990 Model 6. The NVS stored data is then destaged or written out to the DASDs on a batched basis asynchronous to processing the write requests. The term "demand/response" connotes that a new request will not be accepted from a higher echelon until the last request is satisfied by a lower echelon, and a positive indication is made by the lower to the higher echelon.

In order to minimize reprogramming costs, applications executing on a CPU (S/390) and the attendant operating system (MVS) should communicate with invariant external storage architecture even though some components may change. Relatedly, the view of storage associated with an MVS operating system requires that data be variable length formatted (CKD) and stored on an external subsystem of attached disk drives (IBM 3390) at addresses identified by their disk drive cylinder, head, and sector location (CCHHSS). Requested variable length formatted data is staged and destaged between the CPU and the storage subsystem as so many IBM 3390 disk drive tracks worth of information.

It well appreciated that an improved disk storage facility can be attached to a subsystem if the new facility is emulation compatible with the unit it has replaced. Thus, a RAID 5 storage array of small disk drives can be substituted for a large disk drive provided there is electrical and logical interface compatibility. Illustratively, the IBM 3990 Model 6 storage control unit can attach an IBM 9394 RAID 5 array DASD and interact with it as if it were several IBM 3390 large disk drives. Data is staged and destaged to and from the RAID 5 array formatted as CKD formatted 3390 disk drive tracks. The RAID 5 array in turn will reformat the tracks as one or more fixed-block formatted strings and write them out to disk.

Active Fault Management

An active strategy in anticipation of fault, failure, and error would be to continuously monitor all data handling and component performance. Indeed, such systems are described in Glider et al., U.S. Pat. No. 5,214,778, "Resource Management in a Multiple Resource System", issued May 25, 1993, and in Idleman et. al., U.S. Pat. No. 5,274,645, "Disk Array System", issued Dec. 28, 1993.

Glider discloses a method and means for managing both subsystem control code (CC) and an active fault management system (FMS) competing for a disk-based storage subsystem resource access. In Glider, a subsystem uses resource availability states as semaphores to ensure serialization where the FMS and the CC compete for access to the same resource. Significantly, the subsystem requires continuous availability monitoring for all resources for any changes.

Idleman describes a storage subsystem having a pair of two-level, cross-connected controllers providing a first and second failure-independent path to each DASD in a plurality of RAID 3 arrays of DASDs. Data is "striped" to support a parallel read or a parallel write across N+P+Q DASDs, where P and Q are redundancy bytes calculated over the N data bytes. That is, data is moved (parallel read or write) between controllers and a RAID 3 array using on-the-fly transverse redundancy error detection/correction and any-to-any switching between N+P+Q sources and sinks. As with prior art RAID 3, the redundancy blocks are bound to designated redundancy DASDs.

Passive Fault Management

In contrast to the Glider and Idleman references, a passive strategy can be used in a hierarchical, demand-responsive DASD storage subsystem exemplified by the IBM 3990/3390 Model 6. In a word, rather than hunt for fault or failure, the fault management is reactive. That is, the storage subsystem system relies on the presence of at least two failure-independent paths to a data storage location and the invocation of data recovery procedures (DRPs). The DRPs are invoked only upon the detection of error, fault, or failure in signals and data as they are read back or staged from a storage location.

Illustratively, a distorted modulated signal readback from a DASD track over a multibyte extent might cause a pointer to be generated at a signal processing level. It might also appear as a nonzero syndrome set at the ECC digital string reading level. At this point, an FMS would invoke DRPs to resolve the situation. Recovery actions might assume any one of a set of nested causes. The recovery actions themselves might range from a repetition of the read operation with or without a performance adjustment. For example, if the track/head misregistration was an assumed cause, then adjusting the head position relative to the track might be required. On the other hand, if thermal asperities were the assumed burst error cause, then ECC recovery from the syndrome set and the generated pointer might be the DRP of choice, etc.

Subsystem Complexity and Premature
Termination of Recovery Actions

Where a hierarchical demand/response storage system attaches one or more RAID 5 DASD arrays in addition or instead of conventional DASDs, the likelihood of a RAID 5 array becoming incapacitated by a single storage element (HDD) failure resulting in system failure is remote. This derives from the fact that RAID 5 arrays have sufficient information and physical redundancy to fault tolerate at least one failure. This is also the case for even RAID 1 (mirrored pairs of IBM 3390 DASDs) and RAID 3 or RAID 4 array configurations.

In RAID 5 as described in Clark et al., U.S. Pat. No. 4,761,785, "Parity Spreading to Enhance Storage Access", issued Aug. 2, 1988, a parity group of n-1 fixed-size data blocks plus a parity block are written over n DASDs. The blocks of the parity groups are spread such that no single DASD has two blocks from the same parity group and no DASD has all of the parity blocks written thereon. In the event that a single DASD should fail, then the RAID 5 array can laboriously recover data from a referenced parity group by logically combining n-1 blocks from the remaining DASDs. Any additional DASD failure would result in a permanent failure for the array. Thus, restoration of both fault tolerance and reasonable response time requires rebuilding the data stored on the failed DASD and writing out to a spare DASD within the array. But the time required for rebuilding data on a spare varies under conditions of load on the remaining DASDs. This fact is well articulated in Ng et. al., U.S. Pat. No. 5,278,838, "Recovery from Errors in a Redundant Array of Disk Drives", issued Jan. 11, 1994.

Passive fault management has heretofore been designed to resolve well-defined faults or errors within relatively narrow bounds. For instance, if j repeated read accesses of a given DASD yields j repeated ECC errors over a variety of DRPs, then the DASD may be declared dead, i.e., treated as a failure. However, complex devices such as a RAID 5 array of small DASDs substituting for a single large DASD or admixed with them is unlikely to appear to the host or 3990 SCU as a hard disk failure. This means that the inflexible mode of status reporting and handling is more likely to result in frequent and premature termination of host-level applications. These are a subsystem reporting a device as having failed when it in fact did not, or correlatively reporting a device or operation as being successful when in fact it had either failed or was aborted.

SUMMARY OF THE INVENTION

It is accordingly an object of this invention to devise a method and means for flexibly scheduling the report to a host CPU of fault and error conditions detected in an attached hierarchical demand/responsive storage subsystem in order to minimize premature terminations of applications and other host-based catastrophic actions.

It is a related object that said method and means facilitate such flexible scheduling in a storage subsystem having a diverse attachment of storage elements or devices such as RAID arrays and stand-alone DASDs.

It is yet another object that said method and means operably perform even where the subsystem has significantly different ways of responding to error, fault, and failure conditions.

It was unexpectedly observed that if the subsystem, upon the occurrence of fault or failure, provided a long device busy signal to the host for up to a finite maximum duration and isolated the storage device from any host inquiry, then the variable duration data recovery procedures executed at the subsystem and device levels, especially those involving RAID 5 rebuild, could be executed. This would avoid premature declarations of hard faults, failures, and errors.

Restated, the foregoing objects are believed satisfied by a method and means for detecting and correcting a defective operating state or condition of a hierarchical demand/responsive storage subsystem attaching a host CPU. The subsystem includes a plurality of cyclic, tracked storage devices, an interrupt-driven, task-switched control logic, and circuits responsive to the control logic for forming at least one path of a set of paths coupling the host to at least one device. The host enqueues one or more read and write requests against the subsystem. Responsively, the subsystem control logic interprets each request and establishes a path to an addressed storage device.

The method steps of the invention include detecting any anomaly in the read back or staging of data from the device and executing a retry of the counterpart request by active or passive querying of said addressed device. In the event that the detected anomaly persists, a long busy status signal is presented to the host CPU by the control logic. In this regard, the long busy signal is an indication that the counterpart request has yet to be completed by the subsystem.

Next, access to the device is inhibited by the control logic for no more than a predetermined time interval. The method then ascertains whether the inhibited device has returned to an operational state. In the event the detected anomaly is resolved, an attention interrupt is set in the control logic by the device and the device long busy signal is terminated in the host CPU by the control logic. In the event that the time interval has been exceeded and the anomaly is not resolved, one or more data recovery procedures are invoked, including resetting the device by the control logic. Since the device has been driven into a final state, its status is then reported to the host CPU and the next request processed.

DESCRIPTION OF THE PREFERRED EMBODIMENT

Figure 1:
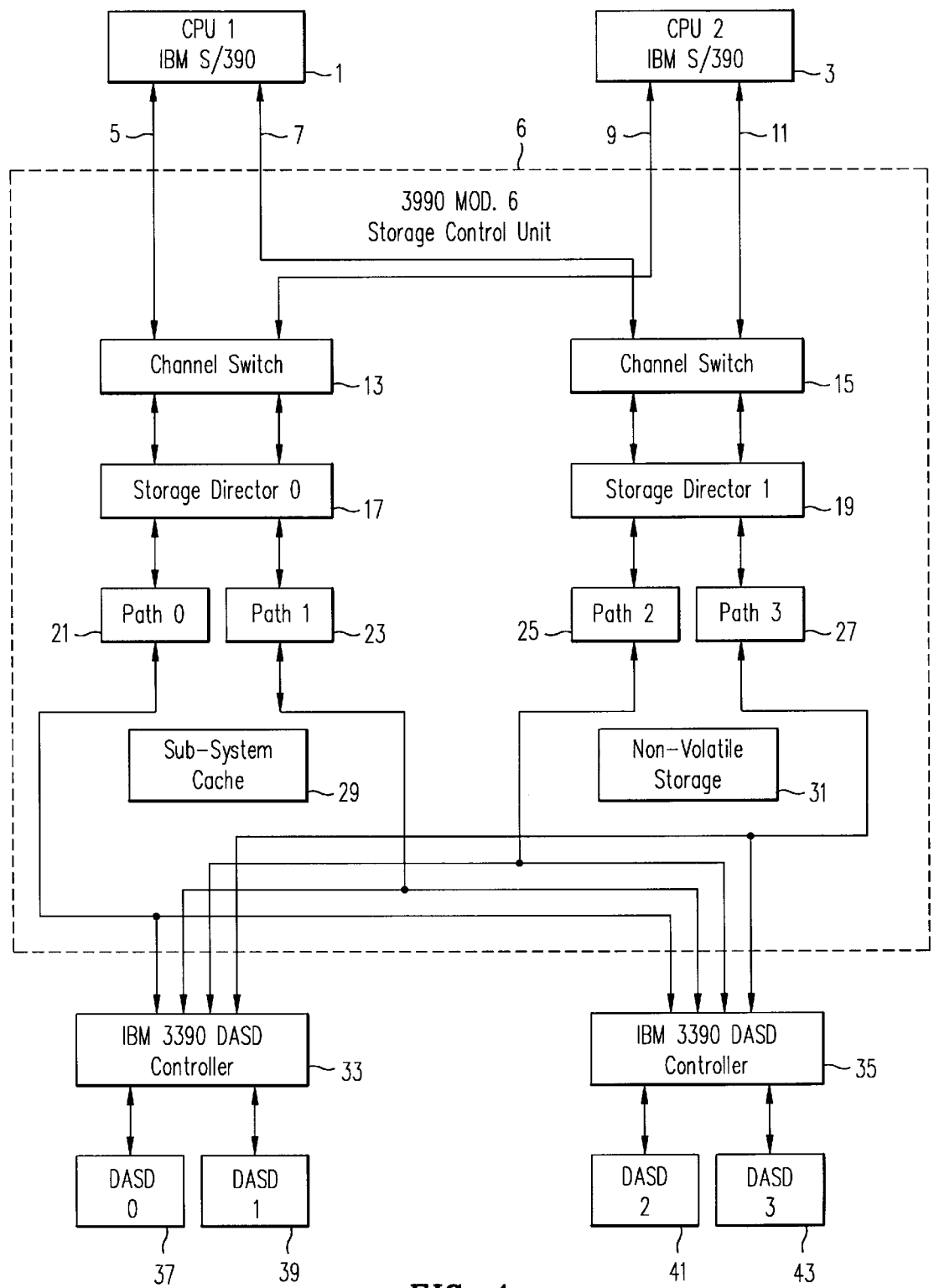
FIG. 1 shows a logical block diagram of an IBM 3990/3390 illustrative of a hierarchical, demand/responsive storage subsystem.

Referring now to FIG. 1, there is shown a functional block diagram depiction of the IBM 3990/3390 Disk Storage Subsystem exemplifying a host-attached, hierarchical, demand/response storage subsystem. This subsystem is shown driven from first and second multiprogramming, multitasking hosts CPU 1 and 3, such as an IBM System/390 running under the IBM MVS operating system. The subsystem is designed such that data stored on any of the DASD storage devices 37, 39, 41, and 43 can be accessed over any one of at least two failure-independent paths from either one of the CPU's 1 or 3. The system as shown provides four failure-independent paths. Illustratively, data on devices 37 or 39 can be reached via 3390 controller 33 over any one of paths 21, 23, 25, or 27. The same holds for data stored on devices 41 or 43 via controller 35. A full description of this principle is to be found in the aforementioned U.S. Pat. No. 4,207,609, herein incorporated by reference.

The 3990 storage control unit consists of at least two storage directors 17 and 19. These are microprocessors and attendant local memory and related circuitry (not shown) for interpreting control information and data from the CPUs, establishing logical and physical paths to the storage devices, and managing fault and data recovery at the subsystem level. The read and write transfer directions are separately tuned. That is, read referencing is first made to cache 29, and read misses causes data tracks to be staged from the devices as backing stores. Write referencing either as a format write or an update write is made in the form of track transfers from the host to a nonvolatile store 31. From NVS 31, it is destaged to the devices through their sundry controllers.

Typically, an application executing on a host 1 or 3 requests to read a file, write a file, or update a file. These files are ordinarily stored on a large bulk 3990/3390 DASD storage subsystem 6. The MVS host (S/390) is responsive to any read or write call from the application by invoking an access method. An access method, such as VSAM, is a portion of the OS for forming an encapsulated message containing any requested action. This message is sent to an input/output (I/O) portion of the host, and ultimately the storage subsystem. Typically, the message includes the storage action desired, the storage location, and the data object and descriptor, if any. This "message" is turned over to a virtual processor (denominated a logical channel). The function of the logical channel is to send the message to the storage subsystem over a physical path connection (channels 5, 7, 9, 11). The storage subsystem control logic (director 17 or 19) then interprets the commands. First, a path to the designated storage device is established and passes the interpreted/accessing commands and data object to the storage device location on a real time or deferred basis. The sequence of commands is denominated "channel command words" (CCWs). It should be appreciated that the storage device may be either "logical" or "real". If the device is "logical", then device logic at the interface will map the access commands and the data object into a form consistent with the arrangement of real devices. Thus, a RAID 5 array of small DASDs substitutes for one or more IBM 3390 large DASDs.

The "access method" portion of the MVS operating system, when processing data objects in the form of variable length ECKD records, also will ascertain either a "new address" or an old (update in place) address. The access method assumes that external storage includes actual physical DASDs, etc. devices. It generates addresses on a DASD device, cylinder, head, and record (CCHHRR) basis. Significantly, the data objects are ordinarily aggregated on a 3380/3390 DASD track basis. That is, when an application requests one or more records, the access method determines what would be an efficient unit of staging, i.e., record staging or track staging between the S/390 and the 3990 SCU. Accordingly, the access method modifies the CCW chain and address extent occasionally from a track to a record. In turn, the logical channel will cause a string of CCWs, together with "track-formatted" data, to be destaged to a 3990 storage control unit (SCU). An IBM 3990 storage control unit (SCU) "interprets" the CCWs and batches the writes in the nonvolatile store 31 (NV write buffer) for later destaging to one or more 3390 logical or physical DASDs 37, 39, 41, 43. If a track is written out to a real 3390 DASD, then it will perform ECC processing as discussed subsequently. Originally, an access method comprised a set of protocols for moving data between a host main memory and physical input/output devices. However, today it is merely a mapping to a logical view of storage, some of which may be physical storage.

Figure 2:
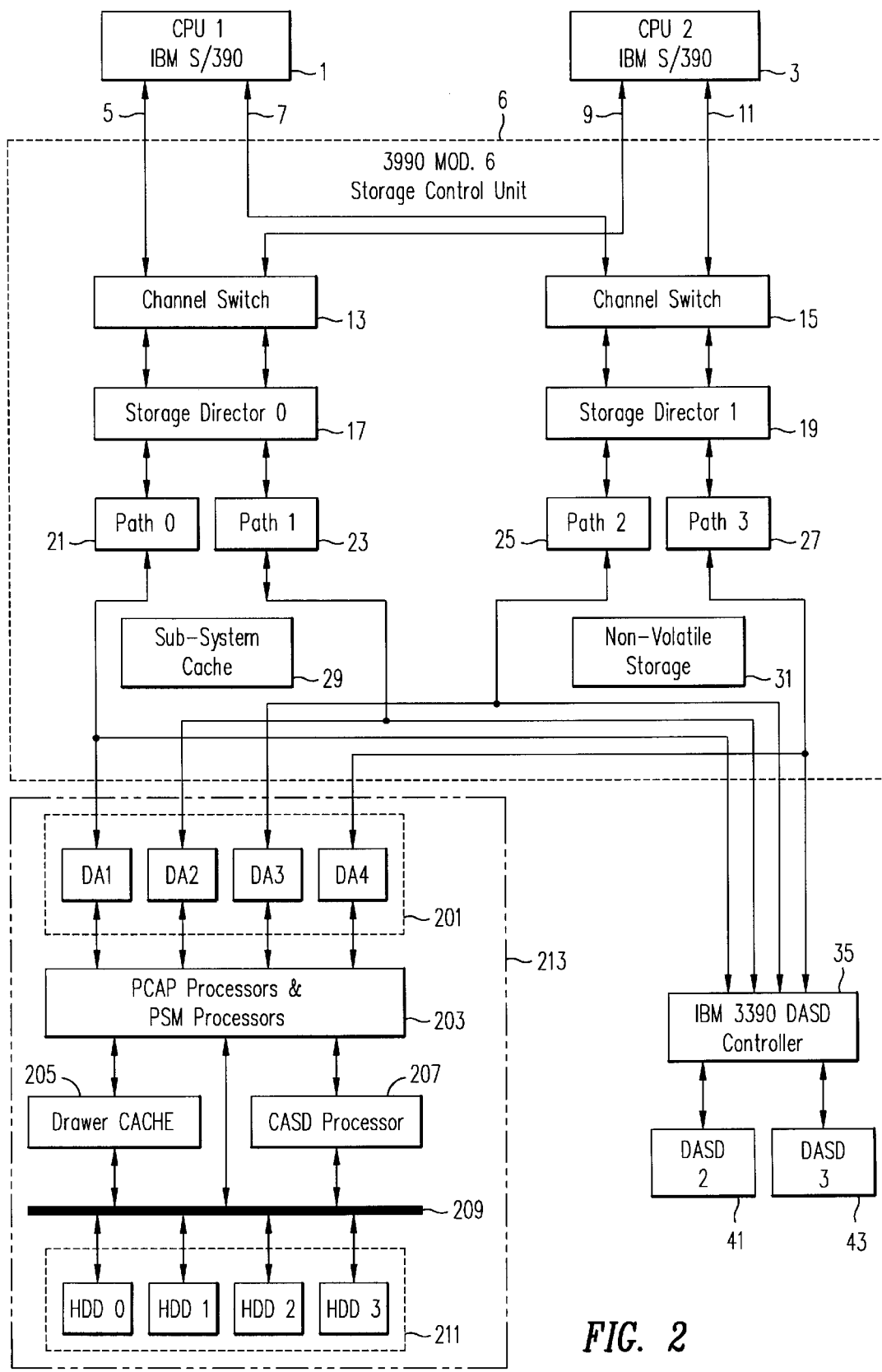
FIG. 2 depicts the subsystem of FIG. 1 but is modified to set out the attachment of a RAID 5 DASD array as a logical 3390 DASD in addition to the attachment of real 3390 DASDs.

Referring now to FIG. 2, there is depicted the subsystem of FIG. 1 but modified to set out the attachment of a RAID 5 DASD array 213 as a logical 3390 DASD, in addition to the attachment of real 3390 DASDs. In this regard, the IBM 3990 SCU Model 6 (FIG. 2/6) utilizes a large cache (up to 2 gigabytes) (FIG. 2/29). The data is always staged and destaged in the form of 3380/3390 tracks. This occurs when staging data between a plurality of logical (FIG. 2/213) or real 3390 DASDs (FIG. 2/35, 41, 43) and the 3990 cache (FIG. 2/29) and destaging data between an NV write buffer (FIG. 2/31) and the logical or real 3390 DASDs.

When track-formatted data is written out to the DASDs at the physical device, an ECC check byte is calculated over any destaged tracks and stored with the track. Upon any subsequent read access, an ECC calculation over the staged tracks is again made and a comparison match between the stored values and the calculated values. Any mismatch is indicative of error. Restated, upon read back or staging of the data from a DASD, detection of any nonzero syndrome is an indication of random or burst error in the data.

Referring again to FIG. 2, there is depicted a RAID 5 array 213 of small DASDs 211 attached to the control logic 17, 19 of the IBM 3990 storage control unit 6 over the plurality of paths 21, 23, 25, and 27 via device adapters (DAs) 201. One implementation of RAID 5 arrays is to be found in the IBM RAMAC Array DASD attaching one or more Enterprise System (S/390) ECKD channels through an IBM 3990 Model 3 or 6 storage control unit. The RAMAC Array DASD comprises a rack with a capacity between 2 to 16 drawers. Each drawer 213 includes four disk drives HDD0–HDD3, cooling fans, control processor 207, ancillary processors 203, and a nonvolatile drawer cache 205. It is configured as a track staging/destaging to three DASDs' worth of data space and one DASD's worth of parity in a RAID 5 DASD array. Each drawer emulates between two to eight IBM 3390 Model 3 volumes.

Functionally, the DAs 201 provide electrical and signal coupling between the control logic 17 and 19 and one or more RAID 5 drawers. As tracks are staged and destaged through this interface, they are converted from variable length CKD format to fixed-block length FBA format by the ancillary processors 203. In this regard, drawer cache 205 is the primary assembly and disassembly point for the blocking and reblocking of data, the computation of a parity block, and the reconstruction of blocks from an unavailable array of DASDs. In this embodiment, three DASDs are used for storing parity groups, and the fourth DASD operates as a hot spare. If a dynamic (hot) sparing feature is used, then the spare must be defined or configured a' priori. Space among the three operational arrays is distributed such that there exists two DASDs' worth of data space and one DASD's worth of parity space. It should be pointed out that the HDDs 211, the cache 205, and the processors 203 and 207 communicate over an SCSI-managed bus 209. Thus, the accessing and movement of data across the bus between the HDDs 211 and the cache 205 is closer to an asynchronous message-type interface.

Since passive fault management is used, it should be pointed out that ECC correction is applied only to data as a serial stream read or staged from a given array storage device. The parity block is used only in recovery mode to reconstruct data from an unavailable or failed one of the array DASDs. The recovery takes the form of computing the unavailable block by a modulo 2 addition of the n–1 remaining blocks of a given parity group. Although DASDs in the array can suffer both hard as well as Byzantine faults, the worst case is to treat an array DASD as a hard failure and rewrite the data on the spare DASD, time permitting.

Figure 3:
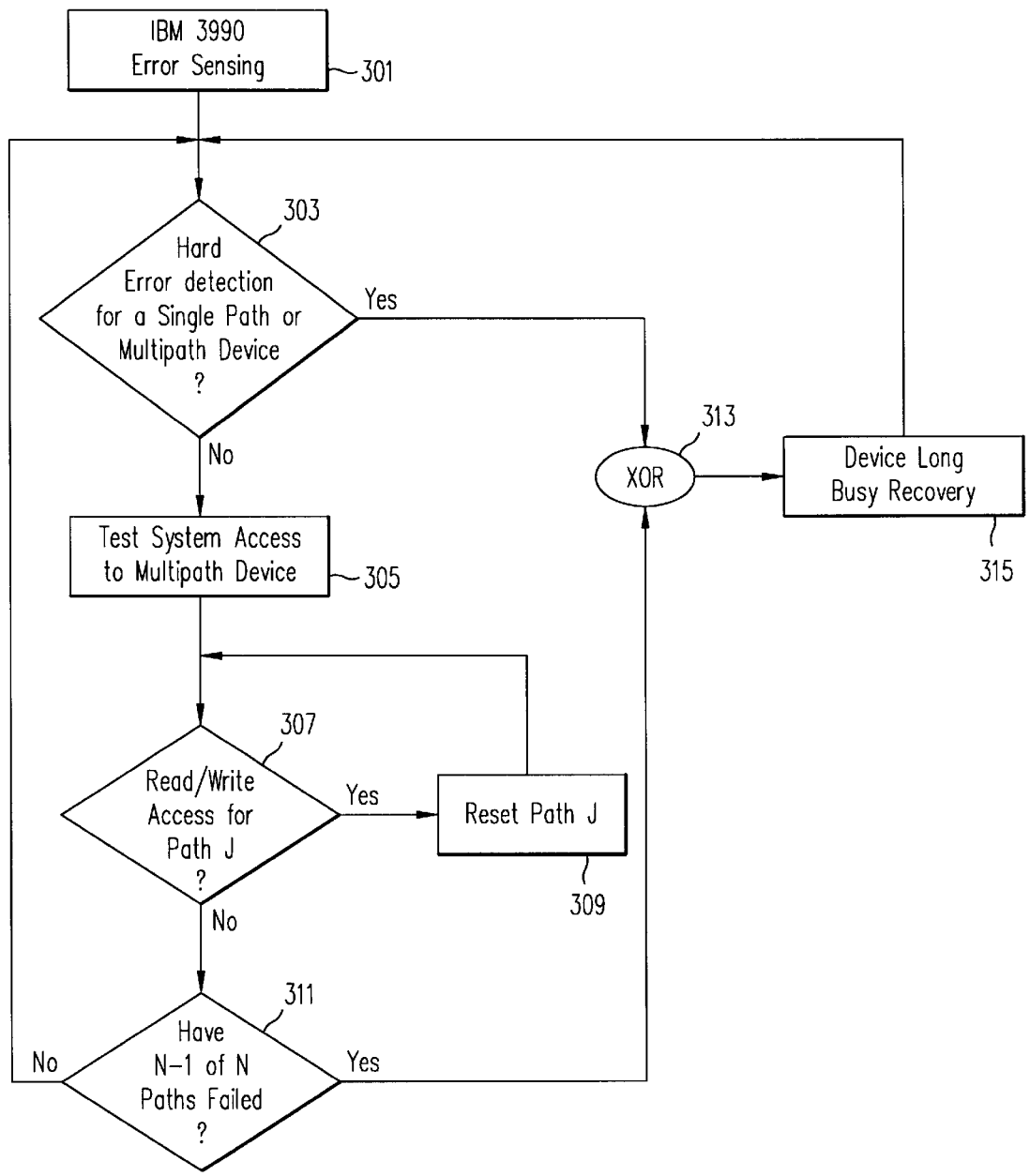
FIG. 3 illustrates the method of the invention as it initially responds to the detection of any anomaly in the read back or staging of data from a storage device whether a single large device or as the logical equivalent formed from an array of small devices.

Referring now to FIG. 3, there is shown the initial subsystem response to the detection of any anomaly in the read back or staging of data from a storage device, whether a single large device or as the logical equivalent formed from an array of small devices. More particularly, the IBM 3990 senses or detects an error or performance anomaly in step 301. This occurs either by control logic 17, 19 polling any of the storage devices (FIG. 2/213, 41, or 43), any of the devices setting an interrupt in the control logic, or failure to respond. Relatedly, steps 303–315 ascertain whether the detected anomaly is of a type or nature for which the device long busy recovery procedure 315 should be invoked. Thus, if the anomaly is a hard device failure or a hard failure in the only path to a device as indicated in step 303, then a long busy recovery process of step 315 will be invoked. Otherwise, as two or more paths to the device associated with the anomaly are operable, then resolution will be attempted without invoking step 315. Clearly, steps 305, 307, and 311 determine whether such multiple paths to a device are available. Parenthetically, for purposes of the method of this invention, a RAID 5 array is considered as a single device. As mentioned in the discussion of the embodiment in FIGS. 1 and 2, a hierarchical subsystem of the IBM 3990/3390 type includes at least two failure-independent paths to each device. However, since paths may be unavailable for a variety of reasons on a permanent or intermittent basis, such a test is necessary for efficient subsystem use of fault management resources.

Figure 4:
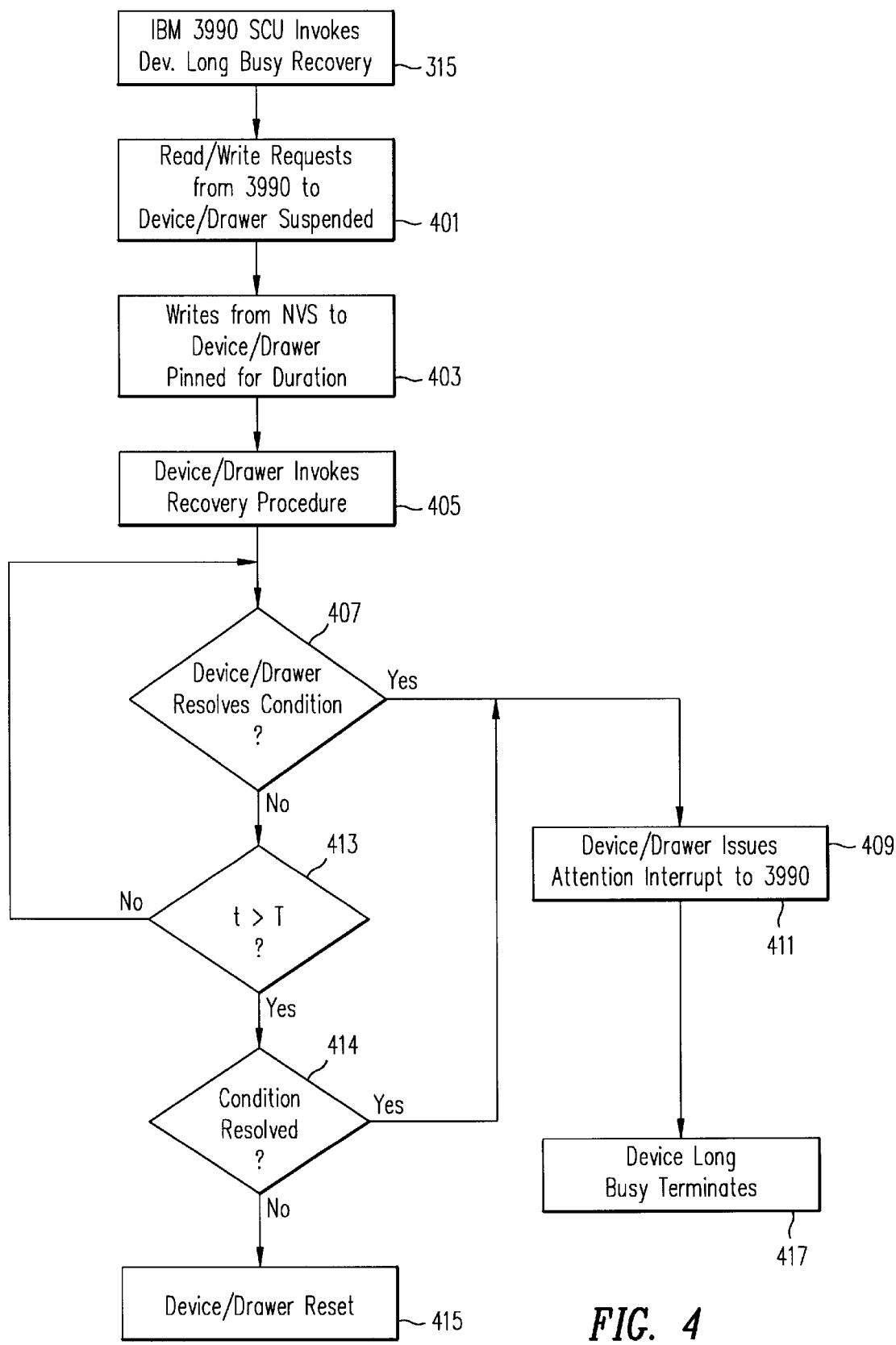
FIG. 4 sets forth the method of the invention after a determination that the error is not one correctable after retry and only one path to the device path is available.

Referring now to FIG. 4, there is shown the method of the invention after a determination that the error is not one correctable after retry and only one path to the device path is available. The correction may involve a variable duration recovery time. The recovery starts in step 315 with the presentation of a device long busy status signal to the host CPU 1, 3 by the control logic 17, 19. In steps 401 and 403, the control unit isolates the device by inhibiting two forms of access through suspension of read and write requests (step 401) and pinning the destaging of tracks in NVS 31 for up to a maximum predetermined duration. In current practice, a maximum time interval/delay in the order of 90 seconds has proven effective. The control in step 405 passes to the device for invoking one or more recovery procedures for resolving the anomaly. It should also be appreciated that when a device operates in a recovery mode, it operates from a linear list of nested DRPs ordered on statistical assumptions as to causes of the anomaly.

The recovery procedures at the device level include correcting an error or erasure in a binary data stream of linear cyclic codewords using only nonzero syndromes, an erasure locator polynomial, and pointers. Also, the list of DRPs may include conditional branches to DRPs otherwise lower in list order such as where detection of a possible erasure or burst sets an interrupt in the device microprocessor.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. A method for detecting and correcting a defective operating state or condition of a hierarchical demand/responsive storage subsystem of the passive fault management type attaching a host CPU, said subsystem including a plurality of cyclic, tracked storage devices, an interrupt-driven, task-switched control logic, and means responsive to the control logic for forming at least one path of a set of paths coupling the host to at least one device, said host enqueuing one or more read and write requests to said subsystem, said subsystem control logic responsively interpreting each request and establishing a path to an addressed storage device, comprising the steps at the subsystem of:

(a) detecting an anomaly in the read back or staging of data from the device and executing a retry of the counterpart request by active or passive querying of said addressed device;

(b) in the event that the detected anomaly persists, presenting a long busy status signal to the host CPU by the control logic, said long busy signal being an indication that the counterpart request has yet to be completed by the subsystem;

(c) inhibiting host access to the device by the control logic for no more than a predetermined time interval;

(d) ascertaining whether the inhibited device has returned to an operational state, and
  (1) in the event the anomaly is resolved, setting an attention interrupt in the control logic by the device and terminating the device long busy signal in the host CPU by the control logic, and
  (2) in the event that the time interval has been exceeded and the anomaly is not resolved, invoking one or more data recovery procedures including resetting the device by the control logic; and (e) reporting status to the host CPU.

2. The method according to claim 1, wherein the step of ascertaining whether the inhibited device has returned to an operational state includes executing at least one step selected from the set of steps consisting of polling device status by the control logic, setting of an interrupt in the control logic by the device, and exceeding the predetermined (recovery) time.

3. The method according to claim 1, wherein the step of detecting an anomaly and retrying the request includes the steps of ascertaining whether at least two of the failure-independent paths to the device are operable and invoking step (b) where only one such path is ascertained as available.

4. The method according to claim 1, wherein the step of inhibiting access to the device includes the steps of suspending execution of any new read and write requests and pinning the destaging of any data to the device.

5. In a hierarchical demand/response storage subsystem of the passive fault management type, said subsystem being responsive to read and write requests from a host CPU for establishing access to at least one of a plurality of cyclic, multitracked storage devices over one path selected from a set of at least two failure-independent paths terminating in said device, said subsystem including means for detecting and correcting a defective operating state or condition in the subsystem or attached devices, whereby said detecting and correcting means further comprise:

means for detecting an anomaly in the read back or staging of a binary data stream from a device and for retrying said read back or staging;

means for ascertaining whether only one path to the device is operable, whether the anomaly persists after retry and, if so, for presenting a long busy status to the host CPU;

means for inhibiting host access to the device for up to a predetermined time interval;

means for terminating the long busy status in the host CPU responsive to an attention interrupt from the device indicative that the inhibited device has returned to an operational state and the anomaly has been resolved;

means responsive to the time interval having been exceeded and the nonresolution of the anomaly for invoking one or more data recovery procedures including resetting the device; and means for reporting the current status of the device to the host.

6. An article of manufacture comprising a machine-readable memory having stored therein indicia of a plurality of processor-executable control program steps for detecting and correcting a defective operating state or condition of a hierarchical demand/responsive storage subsystem of the passive fault management type attaching a host CPU, said subsystem including a plurality of cyclic, tracked storage devices, an interrupt-driven, task-switched control logic, and means responsive to the control logic for forming at least one path of a set of paths coupling the host to at least one device, said host enqueuing one or more read and write requests to said subsystem, said subsystem control logic responsively interpreting each request and establishing a path to an addressed storage device, said plurality indicia of control program steps executable at the subsystem include:

(a) indicia of a control program step for detecting an anomaly in the read back or staging of data from the device and executing a retry of the counterpart request by active or passive querying of said addressed device;

(b) indicia of a control program step in the event that the detected anomaly persists for presenting a long busy status signal to the host CPU by the control logic, said long busy signal being an indication that the counterpart request has yet to be completed by the subsystem;

(c) indicia of a control program step for inhibiting host access to the device by the control logic for no more than a predetermined time interval;

(d) indicia of a control program step for ascertaining whether the inhibited device has returned to an operational state, and
  (1) in the event the anomaly is resolved, for setting an attention interrupt in the control logic by the device and for terminating the device long busy signal in the host CPU by the control logic, and
  (2) in the event that the time interval has been exceeded and the anomaly is not resolved, for invoking one or more data recovery procedures including resetting the device by the control logic; and (e) indicia of a control program step for reporting status to the host CPU.

* * * * *